United States Patent [19]

Koukal

[11] Patent Number: 4,683,925
[45] Date of Patent: Aug. 4, 1987

[54] JIG CARRIAGE FOR A RECESSING AND SHAPING MACHINE USED IN WOODWORKING

[76] Inventor: Anton Koukal, Bosslerstrasse 18, D-7321 Zell/Aichelberg, Fed. Rep. of Germany

[21] Appl. No.: 586,253

[22] Filed: Mar. 5, 1984

[30] Foreign Application Priority Data

Mar. 4, 1983 [DE] Fed. Rep. of Germany ....... 3307808
Sep. 13, 1983 [DE] Fed. Rep. of Germany ....... 3333099

[51] Int. Cl.⁴ .............................................. B27C 5/06
[52] U.S. Cl. ................................. 144/145 R; 83/410; 83/413; 144/145 A; 409/87; 409/93; 409/126
[58] Field of Search ..................... 83/413, 410, 565; 409/84, 93, 79, 126, 89, 87; 144/145 R, 145 A

[56] References Cited

U.S. PATENT DOCUMENTS

| | | | |
|---|---|---|---|
| 3,739,826 | 6/1973 | Schell | 144/145 R |
| 3,841,370 | 10/1974 | Schell | 144/145 R |
| 4,445,553 | 1/1984 | Hanyzewski et al. | 144/145 A |

Primary Examiner—W. D. Bray
Attorney, Agent, or Firm—Antonelli, Terry & Wands

[57] ABSTRACT

An X-Y coordinate carriage for a routing machine with which such a routing machine can be retrofitted. The coordinate carriage includes a cross-carriage and a longitudinal carriage having a torsion- and bending-resistant frame of lightweight construction, displaceably guided by mutually spaced bearings on a guide shaft mountable laterally to a worktable of the routing machine and supported on an opposite side of the worktable by a support roller against a support rod fastened laterally thereto and running parallel to the guide shaft. Guide shafts and retaining blocks support and guide the cross carriage, and bearing blocks are provided for displaceable mounting the cross carriage. The bearing blocks are disposed in spaces between hollow members of the longitudinal carriage and the cross carriage, whereby the guide shafts run approximately at a level of longitudinal horizontal center plane of the hollow members of the longitudinal carriage. Bearing bearing shells of slide bearings, by which the longitudinal carriage is displaceably mounted on the longitudinal guide shaft and the cross carriage is displaceably mounted on the longitudinal carriage, are cast in bores in bearing blocks having inside diameters greater than outside diameters of the bearing shells.

15 Claims, 10 Drawing Figures

JIG CARRIAGE FOR A RECESSING AND SHAPING MACHINE USED IN WOODWORKING

The present invention relates to a carriage and, more particularly, to a coordinate carriage for a routing machine usable in woodworking, by means of which the workpiece can be moved in a working plane under the control of two mutually perpendicular coordinate directions along a predetermined routing pattern or path.

Coordinate carriages of the aforementioned type, constructed as machine elements integrated into a machine frame, have been proposed and, with the aid of a numerical control device or an analog follower control device, the workpiece is able to execute motions as desired by suitable superimposition of movements of the longitudinal and cross carriages within the work area provided. Routing machines equipped with a coordinate carriage of this type can indeed be used flexibly within the working range of the coordinate carriage, but suffer from the disadvantage that the working area is limited in both the X and Y directions, while in the case of routing machines which have a stable worktable instead of a coordinate carriage, a very much greater working area is provided and, in particular, very long workpieces can be processed as well, since limitation occurs only in one coordinate direction, determined by the dimensioning of the machine frame.

With a routing machine equipped with a coordinate carriage, therefore, only a limited number of typical tasks arising in a joinery can be handled.

When the financial capability of a joinery is insufficient to be able to finance both a routing machine with coordinate carriage as well as a routing machine with a fixed worktable, such an enterprise is forced to decide in favor of the latter type of machine, with the disadvantage that, in many instances, inefficient operation must be accepted.

The goal of the invention, therefore, is to provide a coordinate carriage for routing machines, usable in conjunction with a routing machine with a worktable, easily mountable on the latter and removable again therefrom as necessary, as well as economically manufacturable.

In accordance with advantageous features of the invention, the coordinate carriage includes a longitudinal carriage having two hollow members of a lightweight construction, spaced horizontally from each other and extending parallel in a wide direction. The members are joined together to form a torsion and bending-resistant frame, with the frame being guided by bearings disposed at intervals from each other on the guide shaft laterally lockable to a worktable of a routing machine and located below a level of the top of the table, and supported at the opposite side of the worktable by a support roller against a support rod fastened laterally to the support roller and running parallel to the guide shaft. The coordinate carriage also includes a cross carriage displaceably guided in a Y-direction on the longitudinal carriage. The cross carriage includes two laterally spaced hollow members extending parallel in the Y-direction, with the spaced hollow members being permanently connected together by a table plate which crosses or extends above the longitudinal carriage hollow members at a slight clearance of, for example, 0.5 to 1 cm, whereby the hollow members run laterally at a distance from the corresponding adjacent hollow members of the longitudinal carrier. The guide elements that serve to support the cross carriage and to guide the cross carriage on the longitudinal carriage include two guide shafts which extend in the Y-direction as well as retaining blocks for the guide shafts and bearing blocks for displaceably mounting the cross carriage in spaces remaining between the hollow members of the longitudinal carriage and cross carriage so that the guide shafts run approximately at a level of the horizontal lengthwise central plane of the hollow members of the longitudinal carriage.

The coordinate carriage according to the invention is a comparatively lightweight machine element, because of its design, and can be fastened in the correct position quickly and simply on the worktable of a conventional routing machine. The possible uses of a routing machine which can be equipped with a coordinate carriage according to the invention are thereby considerably expanded and the economy of its use is considerably improved. Although only one longitudinal guide shaft is provided, the operating accuracy is absolutely comparable with that of a conventional coordinate carriage, since the manner of fastening of the coordinate carriage to the worktable in accordance with the invention permits simple and reliable provisions for adjustment.

In accordance with further features of the present invention the present invention the two guide shafts are integrally mounted with the longitudinal carriage on retaining blocks that project laterally from hollow members of the longitudinal carriage. The cross carriage is displaceably mounted by bearings located at intervals with respect to one another on the guide shaft and by corresponding bearings on the other guide shaft. By virtue of these further features of the present invention, it is possible to provide for a design for the coordinate carriage in which the cross carriage of the coordinate carriage is displaceably guided on guide shafts permanently connected to the longitudinal carriage.

To provide an attractive and space-saving arrangement of bearing blocks which contain the guide bearings of the cross carriage, according to the present invention, bearing blocks containing bearings of the cross carriage are disposed on facing inner longitudinal sides of the hollow members of the cross carriage.

Preferably, according to the present invention, both guide shafts are integrally mounted with the cross carriage and are mounted on mounting blocks which project downwardly from the cross carriage table and are fastened thereto. Laterally disposed bearing blocks are provided on hollow members of the longitudinal carrier in which the bearing block guide shafts are displaceably mounted. With the guide shafts integrally mounted with the cross carriage and displaceably mounted in bearing blocks on the longitudinal carriage, parts of the hollow members projecting beyond the worktable of the cross carriage and of the guide shafts are present on only one side of the cross carriage.

According to the present invention, two bearing blocks provided provided for displaceably mounting each of the guide shafts are so disposed that a tool axis of the routing machine lies in a common vertical transverse central plane of the two bearings. Two additional bearing blocks of the longitudinal carriage, provided for displaceably mounting of each of the guide shafts, are disposed on the ends of hollow members of the longitudinal carriage adjacent to the longitudinal guide device. This construction has the advantage that the operating pressure of the tool can be accepted satisfactorily and in the same fashion in every position of the workpiece, which favors the operating accuracy of a routing machine equipped with the cross carriage according to the invention.

The the bearing blocks may, according to the present invention, include slide bearings having bearing shells by means of which the longitudinal carriage is displaceably mounted on a longitudinal guide shaft and/or cross carriage is mounted on the longitudinal carriage. Advantageously, the bearing shells are cast in the bores of the bearing blocks whose inside diameters are greater than an outside diameter of the bearing shells. With the bearings receiving the bearing shells of the slide bearings in which the longitudinal carriage and/or the cross carriage is displaceably mounted, mounting in the correct position is considerably simplified.

Advantageously, according to the present invention, the guide shafts are fastened to retaining blocks in the shape of profiled rods which have receiving grooves opening in a downward direction with a circular cross-section shaped inside cross-section. The shafts are firmly fitted to the curved bottoms with an upper circular-shaped portion of a circumference of the shaft being less than 180°. The slide bearings mounted on the longitudinal carriage are provided with bearing shells, which shells fit around the guide shafts over a lower sector range of their circumference which is greater than 180°. With a design of retaining elements for the cross shafts permanently connected to the cross carriage, the shafts enable mounting in the correct position in a simple fashion and with high accuracy, and feasible with parts which are inexpensive to manufacture.

The mounting mounting of the guide shafts in the correct position to be exactly parallel can also be achieved when the guide shaft of the longitudinal carriage and/or cross carriage guide shafts are cast in bores of retaining blocks whose inside diameters are greater than the diameters of the guide shafts.

To ensure that, despite the lightweight design provided for the longitudinal and cross carriages of the coordinate carriage according to the invention, a high degree of manufacturing precision is achieved which likewise ensures a matching degree of operating accuracy, according to the present invention, gaps are provided between the cross carriage table and hollow members supporting the latter, with the gaps being filled by a self-curing plastic resin material. This is especially true of the arrangement of the table plate of the coordinate carriage exactly parallel to the guides.

To ensure that the coordinate carriage can be adjusted in simple fashion to conventional worktable dimensions, in accordance with the present invention, a distance measured in the Y direction between the longitudinal guide groove and longitudinal carriage part supporting the support roller is advantageously adjustable.

To provide for arrangements of the drive units provided for driving the longitudinal and cross carriages which favor a low height of the coordinate carriage, according to the invention, an electric motor, provided for driving the longitudinal carriage, is disposed beneath an angle iron supporting the longitudinal guide shaft, with the angle iron being fastenable by a projecting leg to a work table. The electric drive motor drives a pinon through an angle drive rotatable about a vertical axis, with the pinon being adapted to mesh with a rack running along a lower edge of the downwardly projecting leg of the angle iron. The angle iron connects the longitudinal carriage angle iron to a bottom outside area of the worktable and supporting bearings by means of which the longitudinal carriage is mounted on the longitudinal guide shaft.

Additionally, in accordance with the present invention, it is possible to provide an electric drive motor, provided for driving the cross carriage, to be disposed laterally outside the worktable beneath hollow members of the longitudinal carriage and connected thereto, with the electric drive motor being adapted to drive a pinon rotatable about a vertical axis. The pinon is adapted to mesh with a rack running along a lower edge of a free end segment of one of the hollow members of the cross carriage and is permanently connected thereto.

To achieve freedom of play in the longitudinal and cross carriage drives, which favors operating accuracy, in accordacce with still further features of the present invention, the drive pinon of the longitudinal drive carriage motor and/or cross carriage drive motor is urged by the action of a pretensioned spring means into a meshing engagement with the drive pinion rack.

A photoelectric scanning head can be provided within the framework of a follower control operating with scanning of a drawing. More particularly, in accordance with the present invention, a photoelectric scanning head, provided in the frame of a follower control, is disposed at the free end of one of the two hollow members of the cross carriage, whereby a drawing scannable by the scanner head rests on a support disposed beneath the scanning head.

Additionally, in accordance with yet still further features of the present invention, a scanning head of a follower control may be provided and be firmly connected to the machine frame of the routing machine. For this purpose, a support, located laterally with respect to the worktable of the cross carriage and movable together with the latter, is provided with a drawing support scannable by the scanning head.

Further details and features of the invention will be apparent from the following description of two specific embodiments with reference to the drawings.

Figure 1:
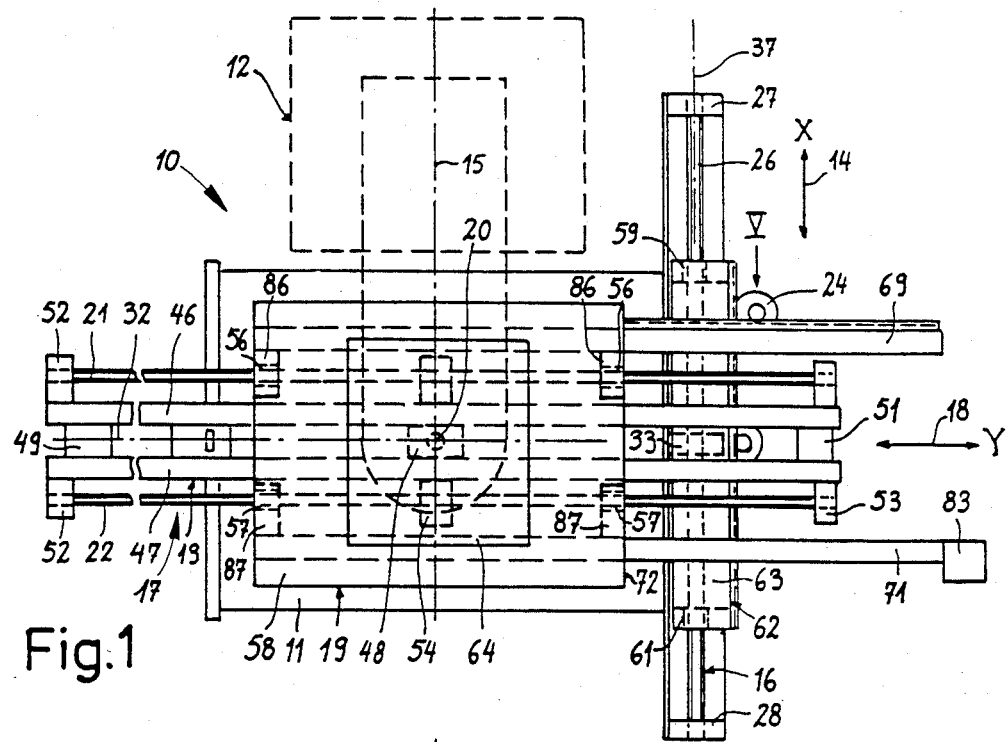
FIG. 1 is a coordinate carriage according to the invention shown in a considerably simplified schematic top view.
Figure 2:
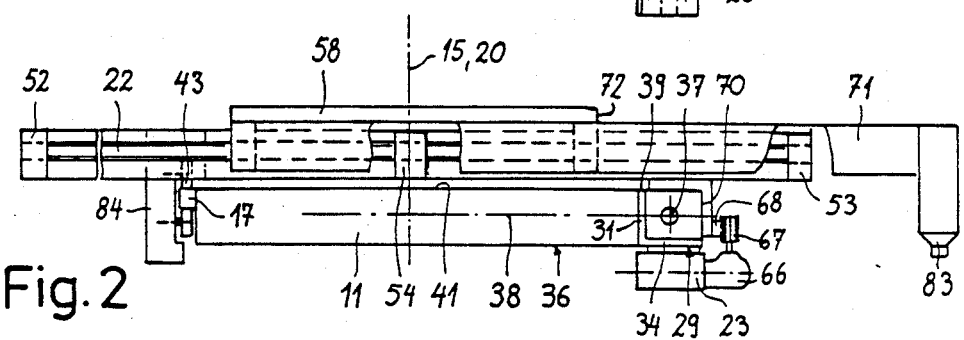
FIG. 2 shows the coordinate carriage according to FIG. 1, viewed in the direction of arrow II in FIG. 2.

Referring now to the drawings wherein like reference numerals are used throughout the various views to designate like parts and, more particularly, to FIGS. 1 and 2, according to these figures, a coordinate carriage generally designated by the reference numeral 10 according to the invention is mounted on worktable 11 of a so-called routing machine generally designated by the reference numeral 12 which, apart from the worktable, is represented solely by its standards indicated by the dotted lines. In addition, the vertical central plane 15 of the standards is shown by a dot-dashed line, in which the axis of rotation 20 of the cutter (not shown) lies.

Coordinate carriage generally designated by the reference numeral 10 comprises a longitudinal carriage 13, with the carriage being disposed in such manner so as to reciprocate in the X direction indicated by arrow 14 in FIG. 1 on guide and support elements generally designated by the reference numeral 16, 17 permanently connected to the worktable 11. The coordinate carriage 10 also includes a cross carriage, generally designated by the reference numeral 19, which can reciprocate in the Y coordinate direction indicated by arrow 18 on longitudinal carriage 13. The cross carriage 19 in turn is slidably mounted on two spaced guide shafts 21, 22 running parallel to one another, with the shafts being permanently connected to longitudinal carriage 13. Electric drive motors 23, 24 are provided to respectively drive the longitudinal carriage 13 and cross carriage 19.

Figure 5:
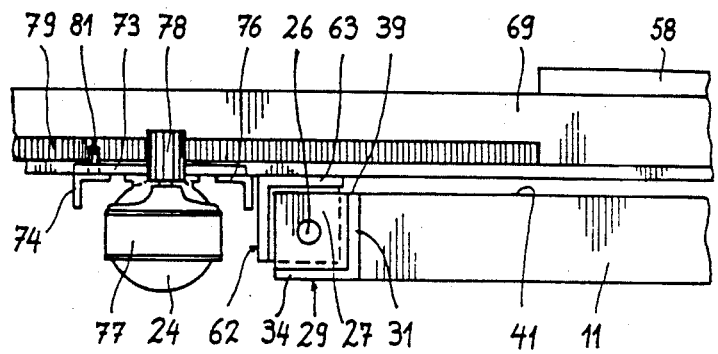
FIG. 5 shows details of the cross carriage drive of the cross carriage according to FIG. 1 in a view looking in the direction of arrow V in FIG. 1.

A ground steel shaft 26 is provided as a guide element 16 for the movements of coordinate carriage 10 occurring in the direction of arrow 14, with the shaft being supported at end tabs 27 and 28 of an angle iron 29 extending in a longitudinal direction 14. The angle iron is permanently bolted by one of its legs 31, directed upward, to the end of worktable 11 which is at the right in FIG. 1 and runs lengthwise. The angle iron 29 is disposed symmetrically relative to the vertical lengthwise central plane 32 of worktable 11 and is additionally provided with a tab 33 which supports steel shaft 26 centrally. The arrangement of angle iron 29, as is best visible from FIG. 2, is such that its horizontal leg 34 extends approximately at the level of the lower limiting face 36 of worktable 11, while central axis 37 of guide shaft 26 is disposed approximately at the level of horizontal central plane 38 of worktable 11. The upper edge 39 of vertical leg 31 of angle iron 29, as is best visible from the detailed drawing in FIG. 5 shown on an enlarged scale, and to whose details reference is likewise expressly made, fits flush with the upper horizontal limiting surface 41 of worktable 11.

Figure 3:
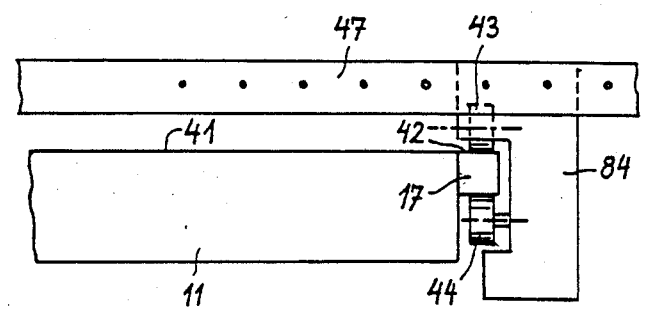
FIGS. 3 and 4 show a cutaway simplified side or end elevation of the support for the longitudinal carriage of the coordinate carriage according to FIG. 1 on the worktable of a routing machine.
Figure 4:
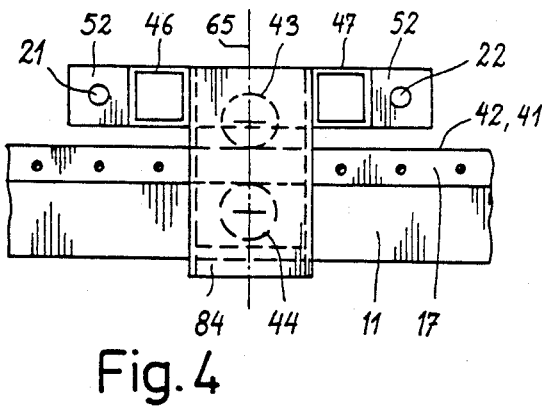

Support element 17, disposed on the side of worktable 11 which is located opposite longitudinal guide 16 is designed as a steel rod with rectangular cross section, ground smooth on its upper and lower faces, the upper limiting face 42 of said rod in turn fitting flush against the top surface 41 of worktable 11. Longitudinal carriage 13, as is best visible from FIGS. 3 and 4, is supported against this upper limiting face 42 by a suppor troller 43. Counter-roller 44, opposite support roller 43 and supportable against the bottom of support rod 17, prevents the longitudinal carriage from tilting around guide shaft 26.

As shown in FIG. 4, the longitudinal carriage comprises as supporting elements two elongated thin-walled hollow members 46 and 47 running parallel to each other and at a distance apart in Y direction 18, said members being connected centrally and in the vicinity of their ends by hollow pieces 48 and 49 and 51 of corresponding cross-sectional shapes, so that the whole is a torsion-resistant load-bearing frame. The two hollow members 46 and 47 are provided in the vicinity of their free ends and in the middle with laterally projecting retaining blocks 52, 53, and 54 at the outer longitudinal sides that are opposite one another, said blocks supporting guide shafts 21 and 22. The space provided in the displacement direction of cross carriage 19 for each two adjacent retaining blocks 52 and 54 or 54 and 53 (FIG. 1) is greater than the possible travel of cross carriage 19 in the direction of arrow 18 by at least the length (measured in the displacement direction 18 of the cross carriage) of bearing shells 56 and 57, by which cross carriage 19 is mounted on these bearing shafts 21 and 22. The bearing shells 56, provided for (displaceable) mounting of cross carriage 19 on one guide shaft 21, and the corresponding bearing shells 57 provided for mounting on the other guide shaft 22, are each disposed on the opposite edges of a table plate 58 of cross carriage 19 which supports the workpiece to be processed, whereby the length of this table plate measured in displacement direction 18 is once again larger by the above-mentioned length of bearing shells 56 and 57 than the travel of cross carriage 19 which is possible in the direction of arrow 18.

Bearings 59 and 61, by which longitudinal carriage 13 is mounted free to reciprocate on guide shaft 26, are disposed at the mutually opposite ends of an angle iron 62, whose horizontal leg 63 (FIG. 5) is permanently attached to longitudinal members 46 and 47 of longitudinal carriage 13. This angle iron 62 which, viewed in displacement direction 14 of the longitudinal carriage, extends to both sides of its lengthwise central plane 65 (FIG. 4) which runs between the two hollow members 46 and 47, has a length such that the longitudinal carriage can travel for the complete length of the cross carriage table plate 58 measured in the X movement direction 14.

The support of longitudinal carriage 13 on support element 17 and guidance along support element 16 on the opposite side of worktable 11 are so dimensioned and disposed that the distance between hollow members 46, 47 from the upper surface 41 of the worktable is approximately 0.5 to 1 cm.

Accordingly, bearings 56, 57 of cross carriage 19, by which the latter is displaceably mounted on guide shafts 21 and 22, are so dimensioned that the table plate 58 of cross carriage 19, in turn, travels approximately 0.5 to 1 cm above hollow members 46, 47 of longitudinal carriage 13. Due to the exactly parallel arrangement of guide shafts 21, 22 of the longitudinal carriage, even smaller spaces between hollow members 46, 47 and cross carriage table plate 58 can be achieved. With a vertical height of hollow members 46, 47 of longitudinal carriage 13 of 70 mm, and a thickness of the cross carriage table plate 58 supporting the workpiece to be processed of 15 mm, whereby this cross carriage table plate 58 is designed as a solid aluminum plate, the total height of coordinate carriage 10 as measured from the top 41 of worktable 11, is only approximately 100 mm. The clearance in the work area remaining between cross carriage table plate 58 and the cutter of routing machine 12 is therefore limited only insignificantly by coordinate carriage 10, so that the latter is especially well suited for mounting conventional routing machines which have a worktable which is fixed or moves up and down within a limited range. This is also favored by the fact that the design of the coordinate carriage including the drive for longitudinal carriage 13 and cross carriage 19 yet to be described is very lightweight, so that the load imposed on the worktable by the subsequently installed coordinate carriage 10 always remains within acceptable limits when coordinate carriage 10, as shown in Figure is so dimensioned that a workpiece 64 can be introduced within the total area of worktable 11. If necessary, if coordinate carriage 10 is designed for longer travels ln the meter range, a vertical support can be provided at the ends of longitudinal guide 16, by which the coordinate carriage can be additionally supported on the floor.

The electric drive motor 23 provided for driving longitudinal carriage 13 is, as shown in FIG. 2, mounted beneath the angle iron 29 which is fastened laterally to worktable 11 and is bolted permanently thereto. With a drive shaft of the drive motor 23 running horizontally, it is provided with an angle drive 56 designed as a reduction gear, upon whose vertically extending drive shaft a pinion 67 is mounted. The pinion 67 meshes with a rack 68 running along the lower edge of the downwardly directed vertical leg 70 of angle iron 62 and permanently connected thereto.

As is evident from FIG. 1, cross carriage 19 comprises two hollow members 67, 71 running parallel and spaced laterally to hollow members 46, 47 of longitudinal carriage 13, disposed on the bottom of cross carriage table plate 58 and permanently connected thereto. The members 69, 71 projects from the side of the cross carriage table plate facing longitudinal guide 16 by slightly more than their length measured in cross direction 18 beyond its lengthwise edge 72. These hollow members 69, 71, to which bearings 56, 57 are fastened, are displaceably mounted with those of cross carriage 19 on guide shafts 21, 22, and have the same dimensions as hollow members 46 and 47 of longitudinal carriage 13.

Figure 6:
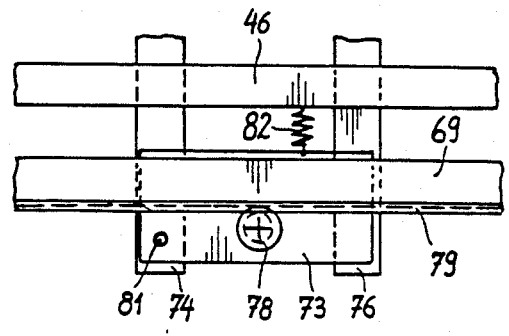
FIG. 6 shows the cross carriage drive according to FIG. 5 in a simplified cutaway top view.

Electric motor 24 provided for driving cross carriage 19, as shown in FIGS. 5 and 6, again with a horizontal arrangement of drive shaft of the motor 24, is fastened to the bottom of a plate 73, resting on the horizontal legs of two angle irons 74, 76, which connect the two hollow members 46, 47 of the longitudinal carriage outside angle iron 62 mounted on guide shaft 26 with one another and project on one side beyond one of the hollow members 46, whereby plate 73 rests on the projecting segments of the two angle irons 74, 76 and is disposed with a slight clearance with respect to one of the hollow members 69 of cross carriage 19. Drive motor 24 is connected in turn to an angle drive 77 on whose vertically disposed drive shaft a pinion 78 is mounted, with the pinion 78 meshing with a rack 79 which runs along the lower edge of the free segment of hollow member 69 of cross carriage 19 and is permanently connected thereto.

Plate 73 is rotatable about a pin 81 disposed on outer angle iron 74. Plate 73 is continuously urged by a pretensioned tension spring 82 in a position in which pinion 78 of drive unit 24, 77, fastened to plate 73, is held in practically a zero play meshing engagement with rack 79.

Drive unit 23, 66 of longitudinal carriage 13, not shown separately, is held in an analogous fashion in engagement with rack 68 of angle iron 62, by which longitudinal carriage 13 is mounted in so that it can reciprocate on steel shaft 26 of longitudinal guide element 16.

Scanning head 83 of a photoelectric follower control provided for automatic control of workpiece processing, is disposed at the end of the free segment of the other hollow member 71 of cross carriage 19. A drawing scannable by the scanning head 83 is permanently disposed, as shown in FIG. 2, laterally below longitudinal guide 16 of longitudinal carriage 13. It is understood that a scanning head 83 could also be mounted above the processing level laterally with respect to the machine head, and that a drawing movable together with cross carriage table plate 38 could be used, which, in turn, would rest on a support surface located laterally with respect to cross carriage table plate 58.

In order to be able to adapt coordinate carriage 10 in simple fashion to different sizes of worktable 11, cross bores are provide in a suitable spacing on hollow members 69, 71 of the cross carriage 19, through which bores threaded bolts are insertable for fastening the cross carriage table plate 58, so that the cross carriage table plate 58 can be fastened at the intervals provided on hollow members 69, 71. Similarly, the longitudinal carriage part 84 that supports support roller 43 and counter-roller 44 can be moved along hollow members 46, 47 of longitudinal carriage 13 in matching increments (FIG. 3).

The coordinate carriage 10 is advantageously mounted on worktable 11 so that, with respect to the routing axis of the cross carriage table 58, the carriage 10 can be shifted for approximately equal distances in the direction of arrow 18 as shown in FIG. 1, i.e. in the Y direction to left and right, or in the direction of arrow 14 as shown in FIG. 1, i.e. in the X direction, backward and forward.

The coordinate carriage 10 according to the invention is of a lightweight construction so that hollow members 46, as well as 69, 71 of the longitudinal carriage 13 or the cross carriage 19 of the coordinate carriage 10 are made as thin-walled welded parts from sheet steel approximately 1.5 mm thick. Only angle irons 29, 62 of longitudinal guide or support element 16 are designed as relatively thick-walled rolled angle irons with a leg thickness of approximately 10 mm. In order to avoid extensive and costly machining of the hollow members 46, 47 and 69, 71, to which guide shafts 21, 22 are mounted or to assure that the cross carriage table plate 58 is disposed exactly flat, which were required for the necessary parallelism of guide shafts 21 and 22 as well as the parallelism of cross carriage table plate 58 with respect to these guide shafts 21 and 22, several measures were implemented as described in detail below.

Bearing shells 56, 57 are provided which partially or completely enclose guide shafts 21, 22, by which bearing shells 56, 57, the cross carriage 19 is displaceably mounted in the direction of arrow 18 on longitudinal carriage 13, with the bearing shells 56, 57 being cast in bearing blocks 86, 87 (FIG. 7), which, as described in connection with FIG. 1, are welded or fastened to the facing inner sides of hollow members 69, 71 and/or cross carriage table plate 58. The diameter of bores 88 in bearing blocks 86, 87 which accept bearing shells 56, 57 is slightly greater than the outside diameter of bearing shells 56, 57 so that an essentially annularly cylindrical space 89 is left between the walls of bores 88 and the outer jacket surfaces of bearing shells 56, 57, with the space being fillable with a synthetic resin. Similarly, guide shafts 21, 22 are cast in bores 91 on retaining blocks 52, 53, and 54, disposed endwise or centrally on the mutually opposite outer sides of hollow members 46, 47 of longitudinal carriage 13, with the inside diameter of the bores 91 likewise being slightly larger than the diameter of guide shafts 21, 22. A self-curing synthetic resin, e.g. an epoxy resin, is suitable as a filler.

To cast guide shafts 21, 22 in the correct position in retaining blocks 52, 53, and 54 of longitudinal carriage 13 or bearing shells 56, 57 in bearing blocks 86 and 87 of cross carriage 19, it is possible, for example, to proceed as follows, namely, guide shafts 21, 22 are supported in an exactly parallel arrangement, as indicated schematically in FIG. 7, by gauge blocks 92 on a flattening plate 93, and cross carriage 19 is supported by additional gauge blocks 94 on guide shafts 21, 22 with an exactly parallel arrangement of its table plate 58 with respect to guide shafts 21, 22, so that the spaces left in bores 91 of retaining blocks 52, 53, and 54 and bores 88 of bearing blocks 86, 87 of cross carriage 19 can be filled with a suitable synthetic resin.

In a manner analogous to that described hereinabove, the mounting of longitudinal guide shaft 26 for proper guidance on angle iron 29 fastened to worktable 11 and the mounting of longitudinal carriage 13 to this guide shaft 26 can likewise be accomplished.

It is also advantageous for the gaps which may be left between cross carriage table plate 58 and hollow members 69, 71 of the cross carriage, to which table plate 58 is bolted, likewise to be cast or filled with synthetic resin, ensuring a large-area support for table plate 58 on these hollow members 69, 71, so that these hollow members 69, 71, which have a lightweight design, cannot deform when table plate 58 is bolted in position.

Figure 7:
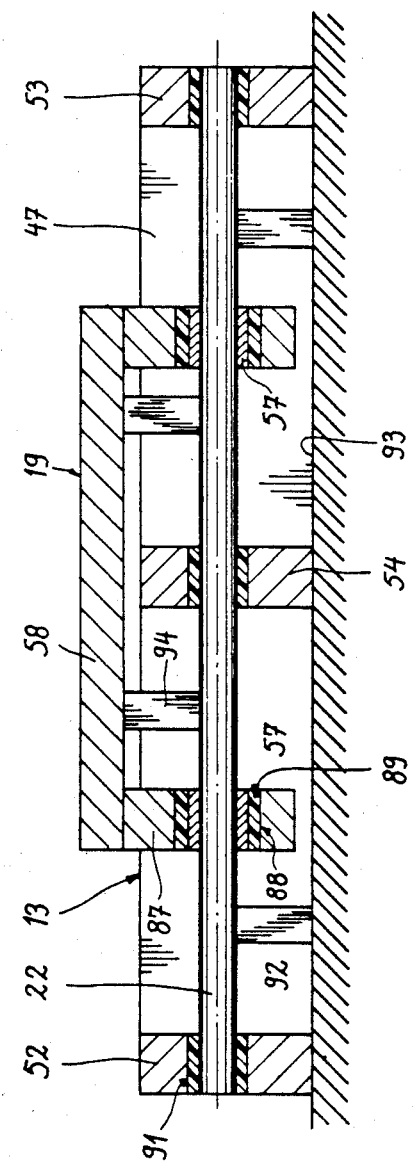
FIG. 7 shows details of the mounting of the cross carriage on one of its guide shafts and its attachment to the longitudinal carriage of the coordinate carriage according to the invention.
Figure 8A:
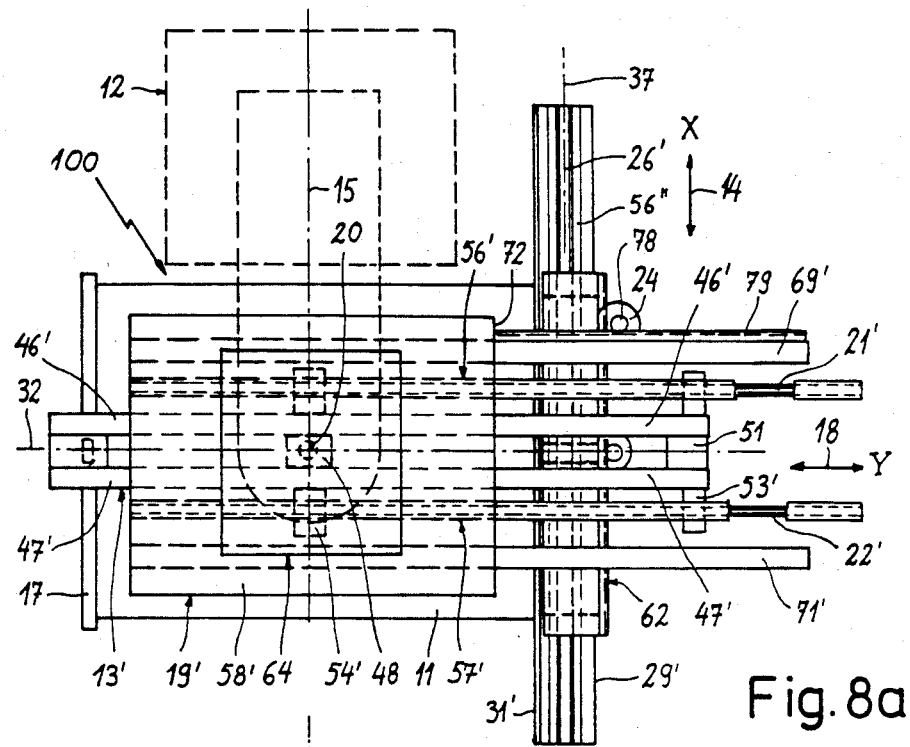
FIG. 8a is a preferred embodiment of a coordinate carriage according to the invention in a simplified representation corresponding to FIG. 1.
Figure 8B:
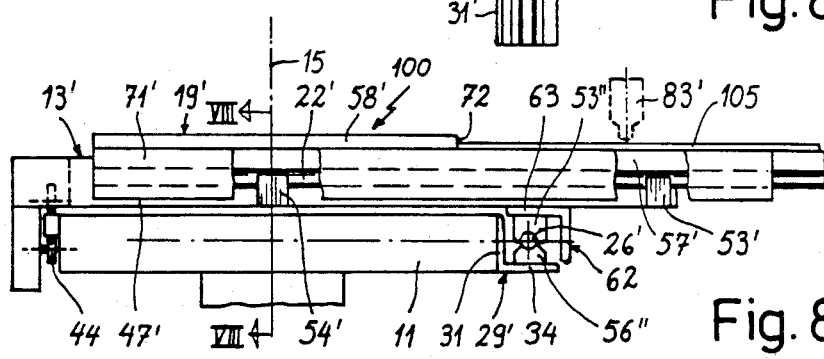
FIG. 8b shows a coordinate carriage according to FIG. 8a in a simplified form corresponding to FIG. 2.
Figure 8C:
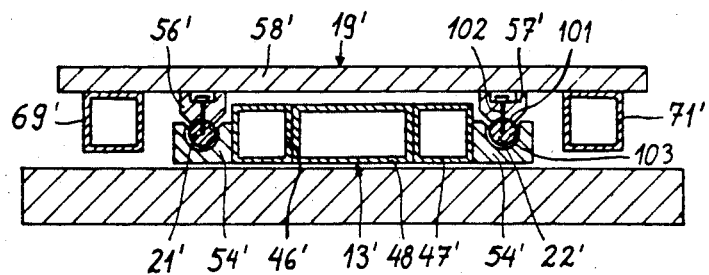
FIG. 8c is a section along line VIII—VIII in FIG. 8b.

With reference to FIGS. 8a to 8c, a further embodiment of a coordinate carriage 100 corresponding in terms of an application thereof to the coordinate carriage 10 of FIGS. 1-7. Coordinate carriage 100 as shown in FIGS. 8a to 8c differs from coordinate carriage 10 essentially in that guide shafts 21', 22' which provide for cross guidance of cross carriage 19' are permanently connected to cross carriage 19' of coordinate carriage 100, and bearings 53', 54', in which cross guide shafts 21', 22' are reciprocally mounted in Y direction 18, are firmly attached to hollow members 46', 47' extending in the Y direction of longitudinal carriage 13' of coordinate carriage 100, which, in addition, apart from the fact that retaining blocks 52, 53, and 54 (FIG. 1) are not provided on longitudinal carriage 13', corresponds in design completely to longitudinal carriage 13 of coordinate carriage 10 according to FIGS. 1 and 2. The guidance and drive of longitudinal carriage 13' in the X coordinate direction 14 as well as its fastening and positionally secure support on worktable 11 can be accomplished in exactly the same fashion as for longitudinal carriage 13 or coordinate carriage 10. The same applies to the drive for cross carriage 19' in Y coordinate direction 18.

Table plate 58' of cross carriage 19' of coordinate carriage 100 is designed as a stable aluminum plate, with a thickness of approximately 15-20 mm. The top and bottom of this table plate 58' are ground very precisely plane-parallel. On the bottom of table plate 58', as shown most clearly in FIG. 8c, the hollow members 69', 71' which extend in the Y direction 18 and have a lightweight design, are fastened, e.g. bolted. Hollow members 69', 71' project beyond the end 72 which is at the right in FIG. 8a and runs in the X direction of the table plate by a distance which corresponds approximately to the length of table plate 58' of cross carriage 19' measured in the Y direction and extend below table plate 58' for its total length measured in the Y direction.

Similarly, guide shafts 21', 22' of cross carriage 19' extend for the total length of table plate 58' measured in the Y direction 18 and project laterally beyond its right-hand end face 72 by a distance which corresponds, in the embodiment shown, to the length of table plate 58' measured in the Y direction 18.

Prismatic aluminum rods fastens the guide shafts 21', 22' to the retaining elements or blocks 56', 57' provided on table 58'. They are fastened to a horizontal lengthwise surface immediately abutting the bottom of table plate 58, e.g. by bolting. The rods, provided as retaining elements 56', 57', each have a downwardly opening groove with a groove contour curved into the arc of a circle, as viewed in cross section, whose curvature matches the jacket curvature of guide shafts 21', 22'. Guide shafts 21', 22' are inserted into grooves 101, abutting their bottoms tightly, and held firmly gripped for their entire lengths in grooves 101 by threaded bolts 102, traversing retaining rods 56' and 57' from top to bottom, with the bolts engaging radially extending threaded bores in guide shafts 21', 22'. The range of the circumference along which guide shafts 21', 22' abut the curved groove bottoms of grooves 101 of rods 56', 57' is approximately 90° C.

Pedestal bearings 53', 54' abut, with lateral spacing, hollow members 46', 47' running in the Y direction and likewise having a lightweight construction. As shown in FIG. 8c, the bearing blocks have bearing shells 103 open at the top, with the bearing shells 103 surrounding a lower circle-sector-shaped circumferential area of guide shafts 21', 22' located opposite grooves 101 of retaining rods 56', 57', which circumferential area is greater than 180°, in the illustrated embodiment, is approximately 240°.

Two of these bearing blocks 54 are so arranged that a vertical transverse central plane corresponding to section plane VIII—VIII in FIG. 8b and FIG. 8c coincides with vertical central plane 15 of the machine frame of the routing machine 12 which contains tool axis 20. As shown most clearly in FIG. 8a, at least two additional bearing blocks 53' are disposed at the free ends of hollow members 46', 47' of the longitudinal carriage 13', whereby the distance, measured in the Y direction, between bearing blocks 53' and bearing blocks 54', roughly corresponds to the length of cross carriage table 58 measured in the Y direction. Additional bearing blocks can be provided between bearing blocks 54', 53', distributed at intervals over the lengths of the segments of hollow members 46' or 347' of longitudinal carriage 13' which runs between the latter.

The design for retaining elements 56', 57' for guide shafts 21', 22', shown in FIGS. 8b and 8c, can also be provided within the framework of the longitudinal guide for longitudinal carriage 13', whereby a rod 56'', used as a retaining element for longitudinal guide shaft 26', is advantageously mounted on the lower leg 34 of angle iron 29 mounted on worktable 11 and bearing blocks 53'', corresponding to bearing blocks 53', 54', are fastened to the upper horizontal leg 63 of angle iron 62, by which angle iron 62 hollow members 46', 47' of longitudinal carriage 13' are connected together.

In addition, bearing blocks 53', 54', and 53'', as shown in conjunction with coordinate carriage 10 in FIG. 7, can be provided on coordinate carriage 100 with bearing shells cast into bearing blocks 53', 54', and 54'' to facilitate exact adjustment of the various guides.

An additional light table plate 105 is mounted on the segments of hollow members 69', 71' which project beyond the end face 72 of cross carriage table 58', on which table plate 105 a drawing can be fastened, which drawing is scannable by a fixed photoelectric scanning head 83' provided for automatic control of the processing procedure.

Instead of retaining elements 56', 57', extending over the total length of guide shafts 21', 22', retainers, disposed at intervals over a length thereof can also be provided with the profile cross section used for retaining elements 56', 57'.

Such retaining blocks are then fastened to the additional table plate 105 in the area disposed laterally with respect to the end face 72 of cross carriage table 58', with the plate 105 then advantageously being fashioned as an aluminum plate of approximately 5–10 mm thick.

I claim:

1. A coordinate carriage means for a routing machine whereby a workpiece is moved in a working plane in two mutually perpendicular coordinate directions along a predetermined routing path, the coordinate carriage means comprising a longitudinal carriage means, control means for reciprocatingly moving the longitudinal carriage means in an X direction, guide means for guiding the reciprocating movement of the longitudinal carriage means, said guide means being integral with a frame of the routing machine, a cross carriage means for carrying a workpiece, means for reciprocatingly moving the cross carriage means in a Y direction on the longitudinal carriage means the longitudinal carriage means further comprises two horizontally spaced lightweight hollow members extending parallel in the Y direction, said two hollow members being joined together to form a torsion and bending-resistant frame, bearing means for guiding said torsion and bending-resistant frame said bearing means being spaced at intervals from each other on a guide shaft means laterally secureable to a worktable of the routing machine and located beneath a level of a top of the worktable, and supported at an opposite side of the worktable by a support roller means against a support rod means fastened laterally to said support roller means and extending parallel to the guide shaft means, said cross carriage displaceably guided in the Y direction on longitudinal carriage means includes two laterally spaced hollow members disposed in parallel to the Y direction, said spaced hollow members of said cross carriage means being permanently connected together by a table plate crossing above the longitudinal carriage means hollow members with a slight clearance in a range of 0.5 to 1 cm, whereby the hollow members of said cross-carriage means extend laterally at a distance from corresponding adjacent hollow members of the longitudinal carriage means, the guide means supporting the cross carriage means and guiding the cross carriage means on the longitudinal carriage means includes two guide shafts extending in the Y direction, and bearing block means for the respective guide shafts and further bearing block means for displaceably mounting the cross carriage means in spaces remaining between the hollow members of the longitudinal carriage means and cross carriage means, whereby the guide shaft means extend approximately at a level of a horizontal longitudinally extending center plane of the hollow members of the longitudinal carriage means.

2. A coordinate carriage means according to claim 1, wherein the two guide shafts are integrally mounted with the longitudinal carriage means on the retaining block means which project laterally from the hollow members on the longitudinal carriage means, and wherein the cross carriage means is displaceably mounted by the further bearing block means spaced from one another on one of the guide shafts and by corresponding bearing block means on the other guide shaft.

3. A coordinate carriage means according to claim 2, wherein the further bearing block means for the cross carriage means are disposed opposite inner longitudinal sides of the hollow members of the cross carriage means.

4. A coordinate carriage means according to claim 1, wherein the guide shafts are integrally mounted to the cross carriage means, said bearing block means project downward from a table of the cross carriage means and are fastened thereto, and wherein the further bearing block means are provided on the hollow members of the longitudinal carriage means means for displaceably mounting the guide shafts.

5. A coordinate carriage means according to claim 4, wherein the further bearing block means includes two bearing blocks provided for displaceably mounting each of the guide shafts, said two bearing blocks being disposed so that a tool axis of the routing machine lies in a common vertical transverse center plane of the two bearing blocks, and wherein two additional bearing blocks of the longitudinal carriage means are provided for displaceably mounting each of the guide shafts and are disposed on ends of the hollow members of the longitudinal carriage means adjacent to a longitudinal guide means.

6. A coordinate carriage means according to claim 1, wherein the bearing block means for at least one of the longitudinal carriage means and the cross carriage means includes bearing shell means for displaceably mounting at least one of the longitudinal carriage means and cross carriage means on the longitudinal carriage, said bearing shell means being cast in bores of bearing blocks having an inside diameter greater than an outside diameter of the bearing shell means.

7. A coordinate carriage means according to claim 6, wherein the guide shafts are secured to the bearing block means, with the bearing block means being shaped as profiled rods having receiving grooves opening downward with a circular cross-section-shaped inside cross section, with curved bottoms of the guide shafts firmly fitting with an upper circular-sector-shaped portion of a circumference thereof which is less than 180°, and wherein bearing block means mounted on the longitudinal carriage means are provided with bearing shells, said bearing shells fitting around the guide shafts over a lower sector range of a circumference thereof which is greater than 180°.

8. A coordinate carriage means according to claim 1 wherein at least one of the guide shafts of the longitudinal carriage means and cross carriage means are cast in bores of the retaining block means, whose inside diameters are greater than diameters of the guide shafts.

9. A coordinate carriage means according to claim 4 gaps remaining between the cross carriage table and the hollow members supporting the latter of the cross carriage means are filled with a self-curing plastic resin material.

10. A coordinate carriage means according to claim 1, wherein means are provided for adjusting a distance measured in the Y direction between the guide shaft and a longitudinal carriage part for supporting a support roller.

11. A coordinate carriage means according to claim 1, wherein said means for reciprocatingly moving the longitudinal carriage means includes an electric drive motor means for driving the longitudinal carriage means, said electric drive motor means support the longitudinal guide shaft and is fastenable by a projecting leg thereof to the worktable, said electric drive motor means being adapted to drive through an angle a drive pinion rotatable about a vertical axis, said drive pinion meshing with a drive pinion rack extending along a lower edge of a downwardly projecting leg of an angle iron connecting the longitudinal carriage means to a bottom outside area of the worktable and supporting bearings by means of which the longitudinal carriage means is mounted on the longitudinal guide shaft.

12. A coordinate carriage means according to claim 1, wherein the means for reciprocatingly moving the cross carriage means includes an electric drive motor means provided for driving the cross carriage means, said electric drive motor means is disposed laterally outside the worktable beneath the hollow members of the longitudinal carriage means and is connected with the latter, said electric drive motor means drives a drive pinon rotatable about a vertical axis, said pinon meshes with a drive pinion rack extending along a lower edge of a free end segment of one of the hollow members of the cross carriage means and is permanently connected thereto.

13. A coordinate carriage means according to claim 11, wherein a pretension spring means is provided for urging the drive pinon of at least one of the longitudinal carriage drive motor means and the cross carriage drive motor means into meshing engagement with the drive pinon rack.

14. A coordinate carriage means according to claim 1, wherein a photoelectric scanning head means is provided in a frame of a follower control means and is disposed at a free end of one of the two hollow members of the cross carriage means, whereby a drawing scannable by said photoelectric scanning head means rests on a support disposed beneath said photoelectric scanning head means.

15. A coordinate carriage means according to claim 1, wherein a scanning head means of a follower control means is provided, said scanning head means being firmly connected to a machine frame of the routing machine, and wherein a support, located laterally with respect to a worktable of the cross carriage means and movable together with the latter, is provided for a drawing support scannable by the scanning head means.

* * * * *